United States Patent [19]

Itoh et al.

[11] Patent Number: 4,870,115
[45] Date of Patent: Sep. 26, 1989

[54] FOAMABLE SILICONE RUBBER COMPOSITION

[75] Inventors: Kunio Itoh, Annaka; Mitsuo Umemura, Matsuida, both of Japan

[73] Assignee: Shin-Etsu Chemical Co., Ltd., Tokyo, Japan

[21] Appl. No.: 322,922

[22] Filed: Mar. 14, 1989

[30] Foreign Application Priority Data

Mar. 16, 1988 [JP]  Japan .................... 63-62759

[51] Int. Cl.$^4$ .................... C08J 9/00; C08J 9/02
[52] U.S. Cl. .................... 521/134; 521/154; 528/31; 528/43
[58] Field of Search .................... 521/154, 134; 528/31, 528/43

[56] References Cited

U.S. PATENT DOCUMENTS

| | | | |
|---|---|---|---|
| 3,959,403 | 5/1976 | La Rochelle | 528/42 |
| 4,134,759 | 1/1979 | Yajima et al. | 528/31 |
| 4,147,538 | 4/1979 | Yajima et al. | 528/31 |
| 4,513,132 | 4/1985 | Shoji et al. | 528/21 |

*Primary Examiner*—Morton Foelak
*Attorney, Agent, or Firm*—Oblon, Spivak, McClelland, Maier & Neustadt

[57] ABSTRACT

A foamable silicone rubber composition, comprising:
(A) a polyorganosilphenylenesiloxane copolymer represented by Formula (I):

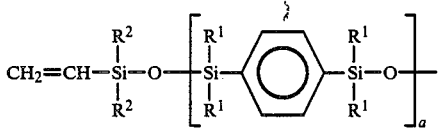

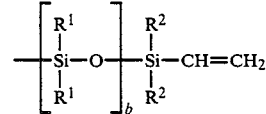

wherein $R^1$ and $R^2$ are each a particular monohydrocarbon group, and a and b are each an integer of 1 or more and have the relation of $1 \geq a/b \geq 0.05$ and $a + b \geq 100$, (B) an organosilicon compound containing a particular organosiloxy unit having a hydroxyl group,
(C) a polyorganohydrogenosiloxane having at least two particular units having an Si—H bond, and
(D) a platinum family metal catalyst.

This composition can provide a foam with good mechanical strength.

17 Claims, No Drawings

FOAMABLE SILICONE RUBBER COMPOSITION

BACKGROUND OF THE INVENTION

1. Field of the Invention

This invention relates to a foamable silicone rubber composition, and more particularly to a foamable silicone rubber composition capable of obtaining a foam with a superior strength.

2. Description of the Prior Art

Methods in which organopolysiloxane compositions foamable at room temperature or by heating to a slightly higher temperature are used have been hitherto proposed as methods for obtaining silicone rubber foams useful as foams, fillers, sealing materials, etc. for use in construction. Known compositions include, for example, a composition in which an organosiloxane having a silicon-bonded hydrogen atom and an organosilane having a silicon-bonded hydrogen atom are subjected to dehydrogenation reaction in the presence of a dehydrogenation catalyst such as a quaternary ammonium salt, a heavy metal carboxylic acid salt or an alkali metal alkoxide (Japanese Patent Publication (KOKOKU) No. 9297/1958 and No. 8755/1969), and a composition in which an organosiloxane having a silicon-bonded hydrogen atom is reacted with an organosilane having a silicon-bonded hydroxyl group in the presence of a platinum compound (Japanese Patent Publication (KOKOKU) No. 12675/1970, No. 42826/1977 and No. 23462/1981, and Japanese Unexamined Patent Publication (KOKAI) No. 196330/1984).

All the silicone rubber foams obtained from these compositions, however, have a lower strength because of their relatively large cells in the foams, so that they have been not necessarily suited as the sealing materials or fillers for use in construction.

SUMMARY OF THE INVENTION

Accordingly, an object of this invention is to provide a foamable silicone rubber composition capable of obtaining a foam through the steps of foaming and curing, with a superior strength attributable to fine cells formed therein.

To solve the above problems, this invention provides a foamable silicone rubber composition, comprising:

(A) a polyorganosilphenylenesiloxane copolymer represented by Formula (I):

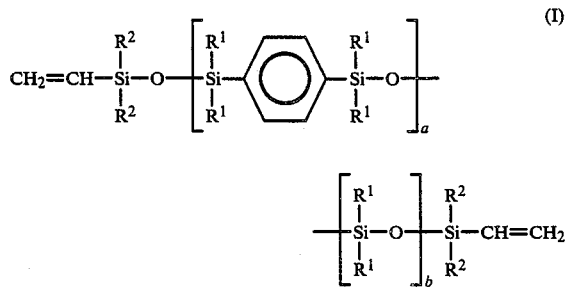

wherein $R^1$'s may be the same or different and each represent a substituted or unsubstituted monovalent hydrocarbon group; $R^2$'s may be the same or different and each represent a methyl group, a phenyl group, or a vinyl group; and a and b are each an integer of 1 or more, provided that they are in the relationship of $1 \geq a/b \geq 0.05$ and $a+b \geq 100$, (B) an organosilicon compound containing in its molecule at least one unit in number of a unit represented by Formula (II):

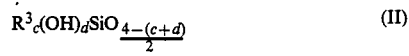

wherein $R^3$ independently represents a substituted or unsubstituted monovalent hydrocarbon group, c is an integer of 0 to 2, and d is an integer of 1 to 4 provided that c+d makes an integer of 1 to 4, (C) a polyorganohydrogenosiloxane having in its molecule at least two units in number of a unit represented by Formula (III):

wherein $R^4$ independently represents a substituted or unsubstituted monovalent hydrocarbon, e is an integer of 0 to 2, and f is an integer of 1 to 3, provided that e+f makes an integer of 1 to 3, and (D) a platinum family metal catalyst.

The silicone rubber composition of this invention can obtain a foam through the steps of foaming and curing, with a superior mechanical strength, in particular, tensile strength. Hence, the composition of this invention can be suitably used as foamed airtight bodies, fillers, sealing materials, etc. for use in construction.

DETAILED DESCRIPTION OF PREFERRED EMBODIMENTS OF THE INVENTION

The component (A) polyorganosilphenylenesiloxane copolymer represented by the above Formula (I) has at least one vinyl group at each of both ends of the molecular chain and also a silphenylene group in the molecular chain. Also, the unit represented by Formula (IV):

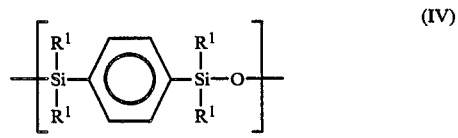

and the unit represented by Formula (V):

contained in the above Formula (I) may be arranged in the component (A) polyorganosilphenylenesiloxane copolymer in a block, alternate, or random fashion.

In the above Formula (I), the plural $R^1$'s bonded to silicon atoms in the molecule of the component (A) copolymer may be the same or different and are each a substituted or unsubstituted monovalent hydrocarbon group selected from, for example, an alkyl group such as a methyl group, an ethyl group, a propyl group or a butyl group, an alkenyl group such as a vinyl group or an allyl group, an aryl group such as a phenyl group, a substituted alkyl group such as a 3,3,3-trifluoropropyl group or a cyanoethyl group. From the viewpoint of the thermal resistance of the resulting foams, preferably $R^1$'s are each a methyl group or a phenyl group. The plural $R^2$'s bonded to silicon atoms in the molecule of the component (A) copolymer may be the same or different and each represent a methyl group, a phenyl group or a vinyl group. Most generally the copolymer is terminated with a dimethylvinylsiloxay group (in this instance, $R^2$'s are all methyl groups). $R^2$'s can control the reactivity. For example, where the copolymer is terminated with a methylphenylvinylsiloxy group (in this instance, $R^2$'s are a methyl group and a phenyl group), the reaction can be retarded. Also, when the copolymer is terminated with a methyldivinylsiloxy group (in this instance, $R^2$'s are a methyl group and a vinyl group) or a trivinylsiloxy group (in this instance, $R^2$'s are all vinyl groups), the reaction can be accelerated and at the same time the crosslink density can be increased to bring about foams with a richer elasticity. More preferred are the instance in which the plural $R^1$'s and $R^2$'s are all methyl groups, and the instance in which the plural $R^1$'s are all methyl groups and $R^2$'s are all vinyl groups.

The component (A) copolymer represented by the above Formula (I) contains in its molecule the unit represented by Formula (IV) and the unit represented by Formula (V) in the ratio (a/b) of $1 \geq a/b \geq 0.05$, and preferably $0.5 \geq a/b \geq 0.2$. The ratio otherwise less than 0.05 may result in an insufficient strength of the resulting foams, and the ratio otherwise more than 1 may result in a poor workability when the composition is practically processed. The copolymer has a polymerization degree a+b of not less than 100, and preferably from 200 to 20,000. This corresponds usually to from 100 to 10,000,000 cSt, and preferably from 500 to 2,000,000 cSt, in terms of the viscosity of a copolymer at 25° C. The polymerization degree a+b otherwise less than 100 may result in an insufficient strength of the resulting foams, also bringing about insufficiency in elasticity and tensile strength as rubber.

This component (A) polyorganosilphenylenesiloxane copolymer is exemplified by those represented by the following formulas:

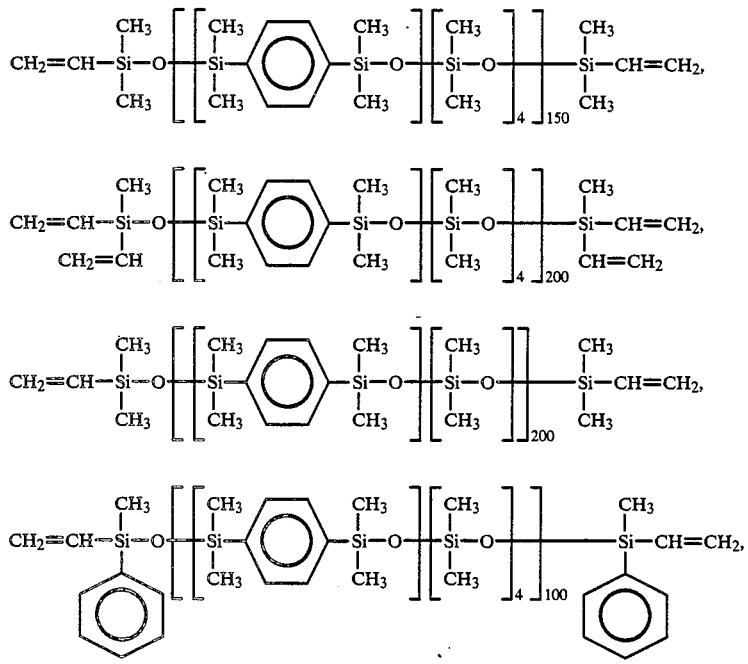

and

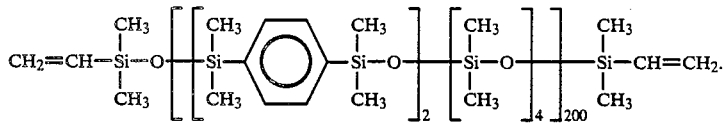

These may be used alone or in combination of two or more. Of these, preferred typical copolymers are those represented by the following formulas:

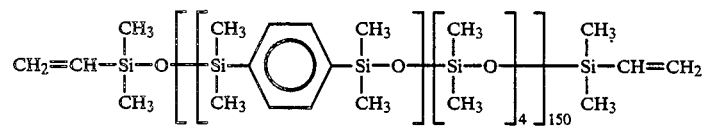

and

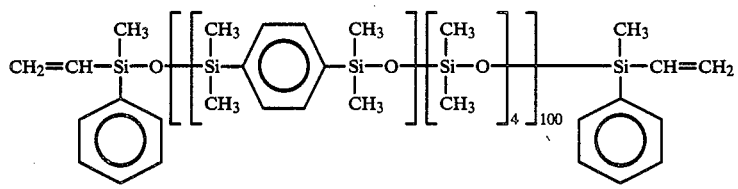

The polyorganosilphenylenesiloxane copolymer, the component (A) of the composition of this invention, can be obtained, in general, by subjecting a compound represented by the formula:

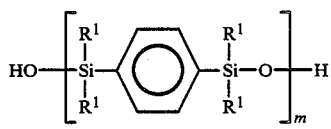

wherein $R^1$ is as defined above, and m is a positive integer,
and a compound represented by the formula:

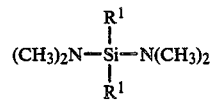

wherein $R^1$ is as defined above, and/or a compound represented by the formula:

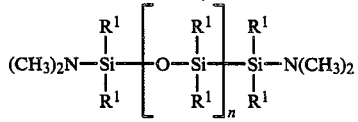

wherein $R^1$ is as defined above, and n is a positive integer,
to condensation with heating (optionally under reduced pressure), and then treating the terminal —SiOH or —SiN(CH$_3$)$_2$ of the molecular chain of the resulting compound, thereby introducing the vinyl group. More specifically, in the instance where the molecular chain is terminated with a hydroxyl group (SiOH), the terminal may be treated with (CH$_2$=CH)(R$^2$)$_2$SiN(CH$_3$)$_2$; in the instance where the molecular chain is terminated with SiN(CH$_3$)$_2$, hydrolysis may be carried out to make the terminal into SiOH, followed by the same treatment with (CH$_2$=CH)(R$^2$)$_2$SiN(CH$_3$)$_2$ as above, thus vinyl groups being introduced to both terminals of the molecular chain. Alternatively, the terminal —SiN(CH$_3$)$_2$ of the molecular chain may be directly treated with a monosilanol represented by the following formula:

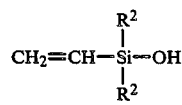

and vinyl groups are thereby introduced to the terminals of the molecular chain, to produce the component (A).

The organosilicon compound, the component (B) of the composition, has in its molecular at least one unit in number, and preferably not less than 3 units in number, of a unit represented by the following Formula (II):

$$R^3_c(OH)_d SiO_{\frac{4-(c+d)}{2}} \quad (II)$$

In Formula (II), $R^3$ independently represents a substituted or unsubstituted monovalent hydrocarbon group, including, for example, a methyl group, an ethyl group, a propyl group and a phenyl group, and preferably a methyl group and a phenyl group. Also in Formula (II), c represents the number of $R^3$ in said unit, and is an integer of 0 to 3, and preferably 1 or 2. The letter d represents the number of the hydroxyl group in said unit, and is an integer of 1 to 4, and preferably 1 to 3. Provided that c+d makes an integer of 1 to 4.

The component (B) may have a molecular weight over a wide range, and therefore may be liquid or solid at room temperature.

Examples of this component (B) include, for example, those represented by the following formulas:

(CH$_3$)$_3$SiOH,

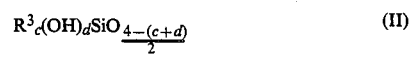

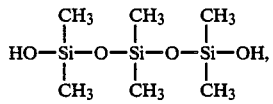

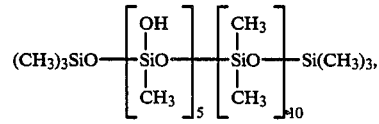

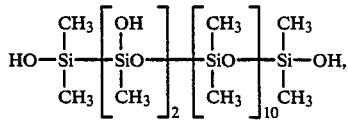

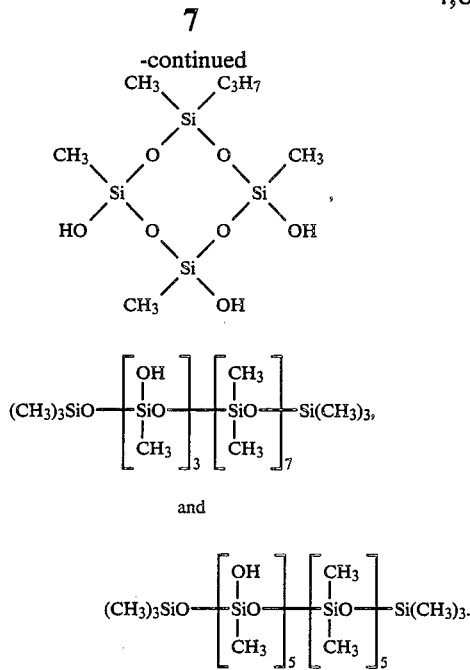

and

They also include a copolymer resin comprised of a [(CH₃)₃SiO$_{\frac{1}{2}}$] unit and a [SiO₂] unit, and a copolymer resin having the unit composition of [(CH₂=CH)(CH₃)₂SiO$_{\frac{1}{2}}$]₀.₀₅[(CH₃)₃SiO$_{\frac{1}{2}}$]₀.₉₅·[SiO₂]₁. These can be used alone or in combination of two or more. Of these, preferred are those compatible with the above component (A). This component (B) is a foamable component that reacts with the component (C) polyorganohydrogensiloxane, described below, by the aid of the component (D) platinum family metal catalyst. Therefore it is desirable for the component (B) to have a relatively lower molecular weight and to have a number of silanol groups in its molecule.

In the composition of this invention, there are no particular limitations on the amount of the component (B), but usually it may preferably be mixed in an amount of from 2 to 20 parts by weight, and more preferably from 5 to 10 parts by weight, based on 100 parts by weight of the above component (A). With an excessively large amount of the component (B), an extreme increase in the crosslinking density may be caused, making the resulting foams brittle and further making them poor in elasticity. With an excessively small amount of the component (B), a less amount of gas may generate, making it impossible to obtain the desired expansion ratio.

The above component (B) can be prepared by the methods well known to those skilled in the art, and, for example, can be prepared by hydrolysis of chlorosilane, alkoxysilane, etc. followed by condensation. Alternatively, it can also be readily prepared by subjecting polyorganohydrogensiloxane and water to dehydrogenation reaction in the presence of a platinum compound as a catalyst. It is further possible to use so-called MQ resins as the component (B), which are obtainable by reacting water glass or an alkylorthosilicate with (CH₃)₃SiCl, (CH₂=CH)(CH₃)₂SiCl, (CH₃)₃Si-OSi(CH₃)₃ or the like in the presence of an acid catalyst.

The polyorganohydrogensiloxane, the component (C) of the composition of this invention, is a linear, branched or cyclic compound having in its molecule at least two in number, and preferably not less than three in number, of a unit represented by the following Average Unit Formula (III):

$$R^4_e H_f SiO_{\frac{4-(e+f)}{2}} \quad (III)$$

Wherein R⁴ represents a substituted or unsubstituted monovalent hydrocarbon group.

R⁴ includes, for example, a methyl group, a propyl group, a phenyl group, a 3,3,3-trifluoropropyl group, and preferably includes a methyl group and a phenyl group. The letter e represents an integer of 0, 1 or 2, and f is an integer of 1, 2 or 3, and preferably 1, provided that e+f makes an integer of 1, 2 or 3.

There are no particular limitations on the viscosity at 25° C., but usually the component (C) may preferably have a viscosity of 1 to 100,000 cSt at 25° C.

Examples of the polyorganohydrogensiloxane, the component (C) of the composition of this invention, include those represented by the following formulas:

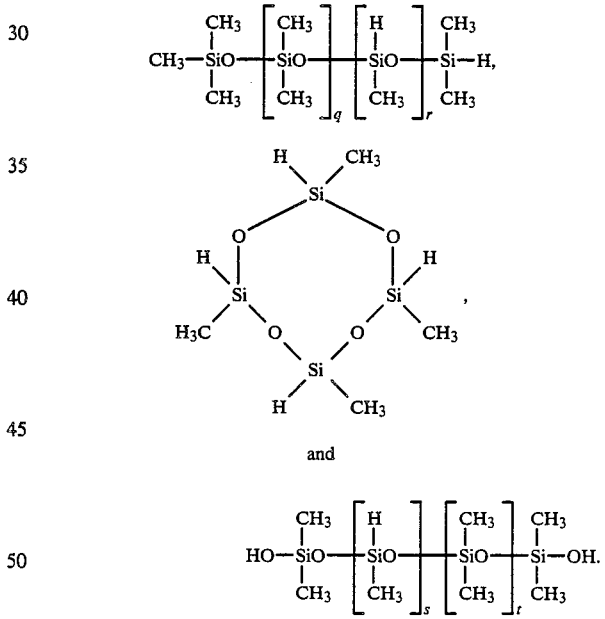

In the above formulas, p, q, r, s and t are each a positive integer.

Among these, preferred are those containing in its molecule at least three Si—H bonds, having 30 mol % or more of Si—H bonds for all the side groups in the molecular chain, and being fluid at 25° C.

In the composition of this invention, the component (C) may preferably be mixed in the amount such that the SiH groups of the component (C) may be contained in an amount of from 1 to 30 mols, and particularly from 5 to 20 mols, per mol of the total amount of the vinyl groups contained in the component (A) and the hydroxyl groups contained in the component (B). With an excessively small amount of the SiH groups contained in the component (C), foaming may be insufficient.

With an excessively large amount, the resulting foams may be hard and brittle, and liable to undergo a great change with time in elasticity and hardness.

This component (C) reacts with the terminal vinyl group in the component (A) and the thermal hydroxyl group in the component (B) by the aid of the component (D) platinum family metal catalyst described below, to achieve both the crosslinking and foaming.

The platinum family metal catalyst, the component (D) of the composition of this invention, includes platinum family metals, compounds or complexes of the metals, including, for example, chloroplatinate, a complex of platinum with an olefin, a complex of platinum with a vinyl group-containing silane or siloxane, a phosphite complex of platinum, and a phosphine complex of platinum.

This component (D) platinum family metal catalyst acts as a catalyst in the addition reaction of the vinyl group in the component (A) with the SiH group in the component (C), as well as in the condensation reaction of the silanol group in the component (B) with the SiH group in the component (C).

There are no particular limitations on the amount of this component (D), but usually it may be mixed preferably in an amount of from 0.1 to 300 ppm, and more preferably from 5 to 100 ppm, based on the total amount of the above components (A), (B) and (C). With an excessively large amount of the component (D), the pot life (or creaming time) of the composition may become too short, thereby extremely lowering the workability and also the thermal resistance. With an excessively small amount of the component (D), its action as a catalyst is insufficient, and no formation of cells is effected in a cured product if bubbles are generated.

In the composition of this invention, inorganic fillers are exemplified by fine powdery silica, calcium carbonate, calcium silicate, titanium dioxide, ferric oxide, zinc oxide, and carbon black may be added in an amount of, for example, from 1 to 100 parts by weight based on 100 parts by weight of the composition of this invention in order to improve the mechanical properties of silicone rubber foams obtained through the steps of foaming and curing. In order to accelerate the foaming, it is also possible to add organic blowing agents such as azobisisobutylonitrile and N,N'-dimethyl-N,N'-dinitrosoterephthalamide, low-boiling compounds such as methanol, cyclohexane and Freon (trademark), or surface active agents capable of lowering the surface tension of a system. It is a further possible to add pigments, dyes, thermal resistance improving agents, flame retardancy improving agents, and silane coupling agents for improving adhesion. The viscosity can also be modified by adding a compatible non-functional organopolysiloxane fluid as a diluent.

The composition of this invention can give a silicone rubber foam by uniformly blending given amounts of the above components (A), (B), (C) and (D), followed by foaming and curing. This foaming and curing can be carried out even by leaving the composition of this invention to stand at room temperature, but can also be carried out under heating at 30° to 70° C. so that the foaming and curing can be achieved in a shorter time.

EXAMPLES

This invention will be described below in detail by giving Examples. In the following Examples, "part(s)" indicates "part(s) by weight".

Examples 1 to 3, Comparative Example 1

In each Example, alpha,omega-divinylsilphenylenesiloxane (viscosity: 140,000 cSt, 25° C.) [component (A)] represented on an average by the following structural formula:

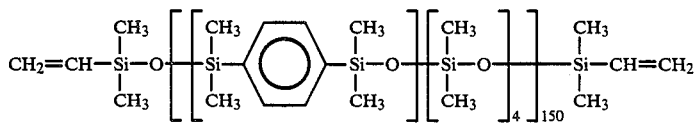

was blended with polymethylhydroxysiloxane (viscosity: 60 cSt, 25° C.) [component (B)] represented by the following formula:

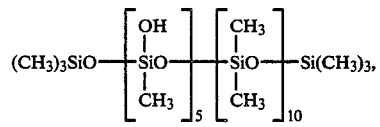

methylhydrogenopolysiloxane represented by the following formula:

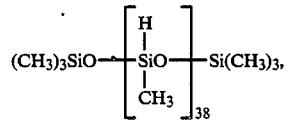

a 1% chloroplatinate isopropanol solution (2% by weight in terms of platinum), and fine powdery silica in the mixing proportion as shown in Table 1, and the mixture was left to stand at room temperature for 60 minutes and foamed, thus preparing silicone rubber foams. Provided that, in Comparative Example 1, alpha,omega-divinyldimethylpolysiloxane represented by the following formula:

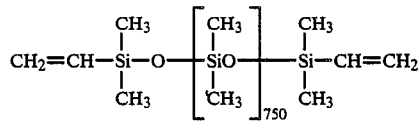

was used in place of the alpha,omega-divinylsilphenylenesiloxane.

Expansion ratio, hardness, elongation and tensile strength of the resulting silicone rubber foams were measured according to the following methods.

Expansion ratio

Calculation according to the formula:

$$\frac{\text{Specific gravity before foaming}}{\text{Specific gravity after foaming}}$$

Hardness

Measured using an ASKER-C hardness tester.

Elongation

Measured according to JIS K6301.

Tensile strength

Measuring according to JIS K6301.
Results obtained are shown in Table 1.

TABLE 1

|  | Example | | | Comparative |
|---|---|---|---|---|
|  | 1 | 2 | 3 | Example 1 |
| Mixing amount [part(s)] | | | | |
| Alpha, omega-divinylsil-phenylenesiloxane | 100 | 100 | 100 | — |
| Alpha, omega-divinyl-dimethylpolysiloxane | — | — | — | 100 |
| Polymethylhydroxy-siloxane | 5 | 10 | 15 | 10 |
| Methylhydrogenpoly-siloxane | 15 | 15 | 15 | 15 |
| Chloroplatinate solution (platinum: 2 wt. %) | 0.8 | 0.8 | 0.8 | 0.8 |
| Fine powdery silica | 15 | 15 | 15 | 15 |
| Properties of foams | | | | |
| Expansion ratio (times) | 2.3 | 2.8 | 3.3 | 3.0 |
| Hardness | 20 | 17 | 15 | 16 |
| Elongation (%) | 130 | 138 | 160 | 110 |
| Tensile strength (kg/cm$^2$) | 3.2 | 3.1 | 2.6 | 1.5 |

Examples 4 to 7, Comparative Example 2

In each Example, alpha,omega-tetravinylsil-phenylenesiloxane (viscosity: 220,000 cSt at 25° C.) represented on an average by the following structural formula:

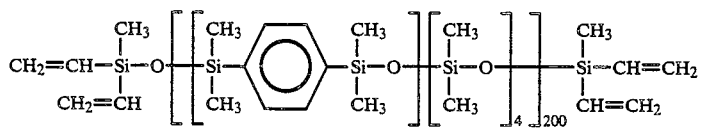

was mixed with a silicone oil represented by the following formula:

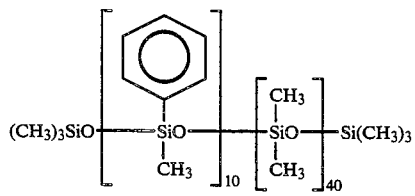

as a dilutent, MQ resin (average molecular weight: 3,300) represented by the compositional formula [(CH$_2$=CH)(CH$_3$)$_2$SiO$_{\frac{1}{2}}$]$_{0.05}$[(CH$_3$)$_3$SiO$_{\frac{1}{2}}$]$_{0.75}$(SiO$_2$), the polymethylhydroxysiloxane and polymethylhydrogenosiloxane which were the same as used in Example 1, and tri-iron tetraoxide in the mixing proportion as shown in Table 2. The mixture was left to stand at room temperature for 90 minutes, and then foamed and cured, followed by heating at 100° C. for 60 minutes. Provided that, in Comparative Example 2, alpha,omega-divinyl-dimethylpolysiloxane represented by the following formula:

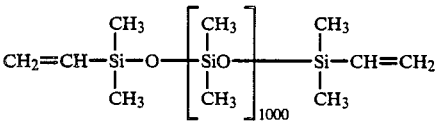

was used in place of the above alpha,omega-tetravinyl-silphenylenesiloxane.

Expansion ratio, hardness, elongation and tensile strength of the resulting silicone rubber foams were measured in the same manner as Example 1. Results obtained are shown in Table 2.

TABLE 2

|  | Example | | | | Comp. Example |
|---|---|---|---|---|---|
|  | 4 | 5 | 6 | 7 | 2 |
| Mixing amount [part(s)] | | | | | |
| Alpha, omega-tetravinylsil-phenylenesiloxane | 100 | 100 | 100 | 100 | — |
| Alpha, omega-divinyl-dimethylpolysiloxane | — | — | — | — | 100 |
| Polymethylhydroxy-siloxane | 5 | 5 | 5 | 5 | 5 |
| Silicone oil | 15 | 15 | 15 | 15 | 15 |
| MQ resin | 10 | 20 | 10 | 20 | 10 |
| Polymethylhydrogeno-siloxane | 13 | 13 | 18 | 18 | 13 |
| Chloroplatinate solution (platinum: 2 wt. %) | 0.8 | 0.8 | 0.8 | 0.8 | 0.8 |
| Fine powdery silica | 12 | 12 | 12 | 12 | 12 |
| Triiron tetraoxide | 1 | 1 | 1 | 1 | 1 |
| Properties of foams | | | | | |
| Expansion ratio (times) | 2.7 | 3.0 | 3.3 | 3.4 | 3.0 |
| Hardness | 22 | 24 | 23 | 25 | 20 |
| Elongation (%) | 160 | 170 | 195 | 180 | 180 |
| Tensile strength (kg/cm$^2$) | 5.4 | 6.3 | 5.0 | 5.9 | 3.0 |

We claim:

1. A foamable silicone rubber composition, comprising:

(A) a polyorganosilphenylenesiloxane copolymer represented by Formula (I):

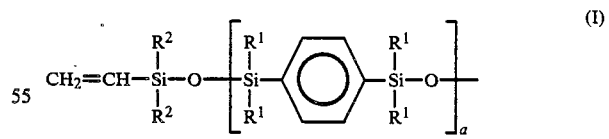
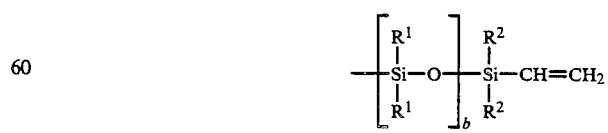

wherein R$^1$'s may be the same or different and each represent a substituted or unsubstituted monovalent hydrocarbon group; R$^2$'s may be the same or different and each represent a methyl group, a phenyl group, or a vinyl group; and a and b are each an integer of 1 or more, provided that they are in the relationship of $1 \geq a/b \geq 0.05$ and $a+b \geq 100$, (B) from 2 to 20 parts by weight of an organosilicon compound containing in its molecule at least one unit in member of a unit represented by Formula (II):

wherein $R^3$ independently represents a substituted or unsubstituted monovalent hydrocarbon group, c is an integer of 0 to 2, and d is an integer of 1 to 4, provided that c+d makes an integer of 1 to 4, (C) a polyorganohydrogenosiloxane having in its molecule at least two units in number of a unit represented by Formula (III):

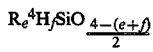

wherein $R^4$ independently represents a substituted or unsubstituted monovalent hydrocarbon, e is an integer of 0 to 2, and f is an integer of 1 to 3, provided that e+f makes an integer of 1 to 3, and (D) a platinum family metal catalyst.

2. The composition of claim 1, wherein $R^1$'s in Formula (I) are methyl groups, and $R^2$'s are methyl groups or vinyl groups.

3. The composition of claim 1, wherein a and b in Formula (I) are integers such that they satisfy the relations of $0.5 \geq a/b \geq 0.2$ and $20,000 \geq a+b \geq 200$.

4. The composition of claim 1, wherein the component (A) is at least one selected from the group consisting of the compounds represented by the following formulas:

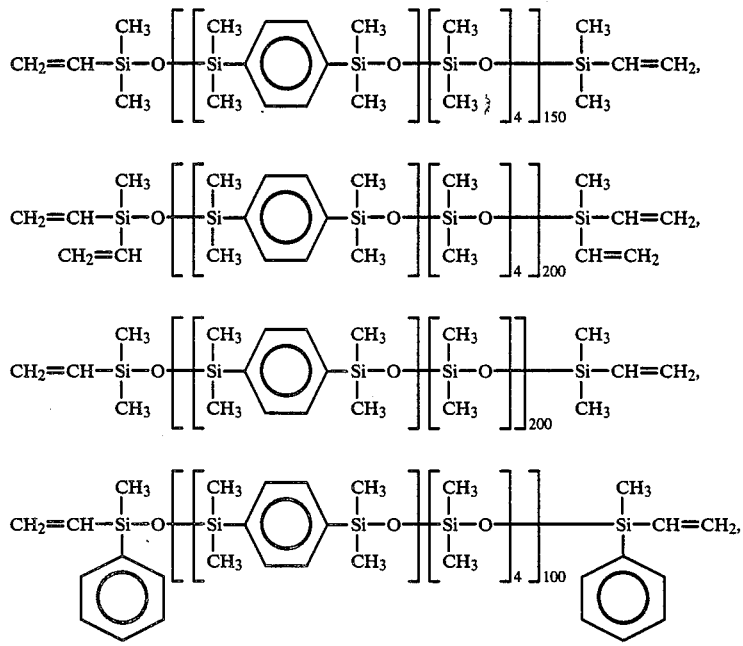

and

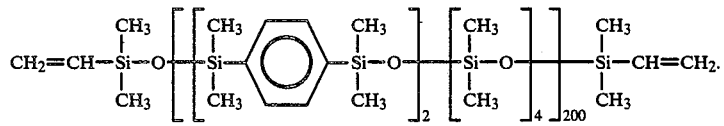

5. The composition of claim 1, wherein the component (B) is an organosilicon compound having in its molecule at least three units in number of the unit represented by Formula (II).

6. The composition of claim 1, wherein $R^3$ in Formula (II) is independently a methyl group or a phenyl group.

7. The composition of claim 1, wherein c in Formula (II) is integer of 1 or 2, and d is an integer of 1 to 3.

8. The composition of claim 1, wherein the component (B) is at least one selected from the group consisting of the compounds represented by the following formulas:

$(CH_3)_3SiOH$,

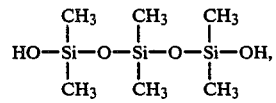

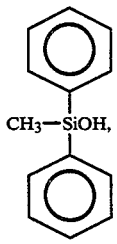

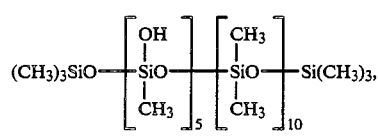

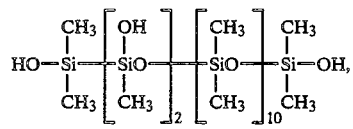

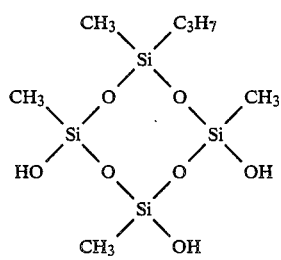

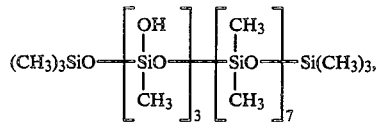

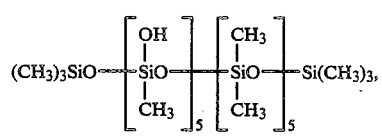

a copolymer resin comprised of a [(CH$_3$)$_3$SiO$_{\frac{1}{2}}$] unit and a [SiO$_2$] unit, and a copolymer resin having the unit composition of [(CH$_2$=CH)(CH$_3$)$_2$SiO$_{\frac{1}{2}}$]$_{0.05}$[(CH$_3$)$_3$SiO$_{\frac{1}{2}}$]$_{0.95}$·[SiO$_2$]$_1$.

9. The composition of claim 1, wherein the component (C) is a polyorganohydrogenosiloxane containing at least three units in number of the unit represented by Formula (III).

10. The composition of claim 1, wherein R$^4$ in Formula (III) is independently a methyl group or a phenyl group.

11. The composition of claim 1, wherein f in Formula (III) is an integer of 1.

12. The composition of claim 1, wherein the component (C) has in its molecule at least three Si—H bonds, and hydrogen atoms comprise not less than 30% of all the side groups bonded to silicon atoms of the main molecular chain.

13. The composition of claim 1, wherein the component (C) is at least one selected from the group consisting of the compounds represented by the following formulas:

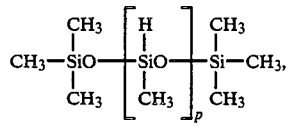

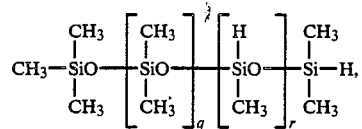

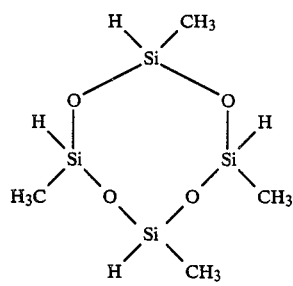

and

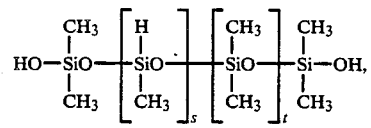

in the above formulas, p, q, r, s and t are each a positive integer.

14. The composition of claim 1, comprising 100 parts by weight of the component (A), and the component (C) in such an amount that the Si—H bonds in the component (C) may be contained in an amount of from 1 to 30 mols per mol of the total amount of the vinyl groups in the component (A) and the hydroxyl groups in the component (B).

15. The composition of claim 1, comprising 100 parts by weight of the component (A), from 5 to 10 parts by weight of the component (B), and the component (C) in such an amount that the Si—H bonds in the component (C) may be contained in an amount of from 5 to 20 mols per mol of the total amount of the vinyl groups in the component (A) and the hydroxyl groups in the component (B).

16. The composition of claim 1, wherein the component (D) is contained in an amount of from 0.1 to 300 ppm based on the total amount of the components (A), (B) and (C).

17. The composition of claim 1, wherein the component (D) is contained in an amount of from 5 to 100 ppm based on the total amount of the components (A), (B) and (C).

* * * * *